I. ZELLERS.
Corn Sheller.
No. 2,432.
Patented Jan'y 24, 1842.
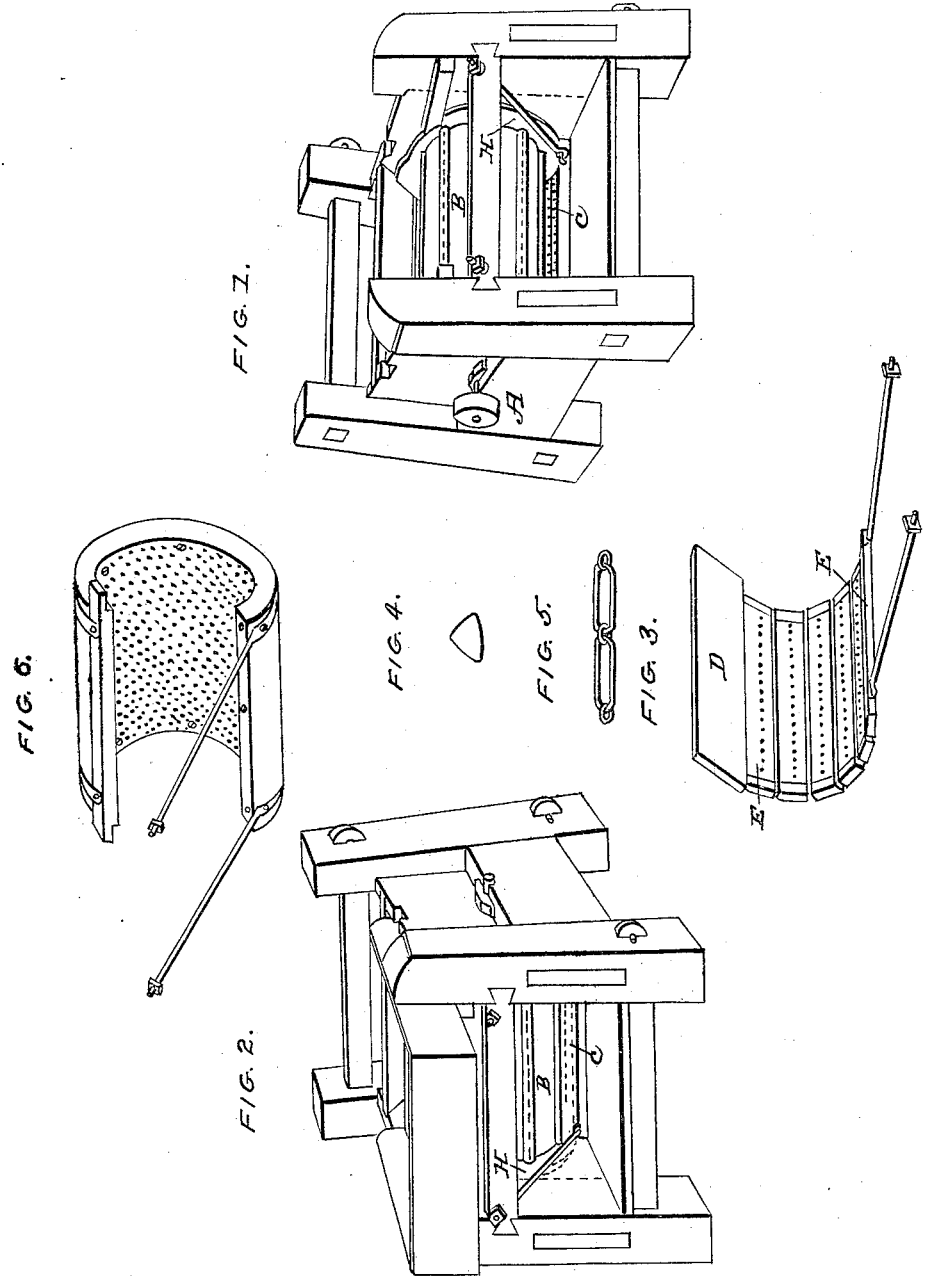

UNITED STATES PATENT OFFICE.

ISAAC ZELLERS, OF GREENWICH TOWNSHIP, WARREN COUNTY, NEW JERSEY.

METHOD OF CONSTRUCTING THE CONCAVES EMPLOYED IN THRESHING-MACHINES, &c.

Specification of Letters Patent No. 2,432, dated January 24, 1842.

*To all whom it may concern:*

Be it known that I, ISAAC ZELLERS, of Greenwich township, Warren county, New Jersey, have invented a new and useful Improvement upon Corn-Shelling Machines; and I do hereby declare that the following is a full and exact description of such improved machine.

The machine is inclosed in an ordinary plank frame as shown in Figure 1, and Fig. 2, of the annexed drawing.

On the outside of the frame is the band wheel A, to connect with the motive power which it is desired to apply to the machine. Through the center of the band wheel passes a wrought iron shaft which revolves in boxes upon each side of the frame as shown in Fig. 1, and Fig. 2. On the middle of the shaft and within the inclosure of the frame is keyed a cast iron cylinder (B). This cylinder is cast with reeds raised on the surface distant from each other about one-eighth of the circumference and rising from the surface in height about three-eighths or five-sixteenths of an inch as shown in Figs. 1 and 2. This cylinder revolves in a corresponding concave (C) more fully represented by Fig. 3, which passes about half way around the cylinder. This concave (Fig. 3) is composed of six staves the upper of which (D) is a plain one of wood for the purpose of feeding in the corn, the remaining five E E are of cast iron each having along the center of its inner face a row of projections cast upon it resembling rounded or Gothic spike heads and represented separately in Fig. 4. The staves E are connected with each other at each end and by a chain Fig. 5 the ends of the staves being inserted into the longer links and the shorter links between the staves acting as hinges. The plain upper stave D is made longer than the remaining five and slides into a groove in the frame. The remaining five staves E, extend only to the face of the frame on each side. In the edge of the lowest stave are fixed two hooks or staples to which are attached two rods as shown in Fig. 3, passing through a cross-piece of the frame and fastened by burs. By means of these rods and burs the concave is drawn up toward the cylinder so as to leave an interval of about one inch between the reeds of the cylinder and the spike heads or projections on the upper stave E and an interval of five-eighths of an inch at the last or lowest stave E.

The staves are prevented from approaching nearer to the cylinder by a circle piece or offset (H) about one and a quarter inches thick placed at each end of the cylinder and fastened against the side of the frame, the edge of which meeting the ends of the staves sustains their pressure toward the cylinder. This concave of linked staves may be removed from the machine and their place supplied by a concave (Fig. 6,) intended for cleaning clover seed which is fastened in the same manner as Fig. 3, but with less interval between the reeds of the cylinder and the projections on the concave. This concave Fig. 6, is of wood lined with sheet iron punctured inward so as to give the projections, and is made firm and solid, not yielding to pressure like the linked concave. The interval between the reeds of the cylinder and the points on the concave (Fig. 6) is barely sufficient to permit the former to pass.

What I claim as my invention and desire to secure by Letters Patent is—

The connecting or uniting the staves of the concave to each other by a movable or flexible joint link hinge bolt or other movable or flexible connection made of iron or other material; by means of which arrangement an independent motion of each particular stave is permitted as well as of the whole concave. The whole being constructed substantially and operating substantially as herein set forth.

ISAAC ZELLERS.

Witnesses:
C. S. EBERLE,
GEORGE STRAUB.